United States Patent
Cypriano et al.

(10) Patent No.: US 11,555,930 B2
(45) Date of Patent: Jan. 17, 2023

(54) SPLIT VERTICAL ADVANCED RECEIVER AUTONOMOUS INTEGRITY MONITORING

(71) Applicant: Honeywell Aerospace SAS, Toulouse (FR)

(72) Inventors: Lucas Almeida Cypriano, Brno (CZ); Jolana Kristufkova Dvorska, Brno (CZ); Jakub Skalicky, Brno (CZ); Martin Orejas, Brno (CZ)

(73) Assignee: Honeywell Aerospace SAS, Toulouse (FR)

( * ) Notice: Subject to any disclaimer, the term of this patent is extended or adjusted under 35 U.S.C. 154(b) by 297 days.

(21) Appl. No.: 16/910,641

(22) Filed: Jun. 24, 2020

(65) Prior Publication Data
US 2021/0405208 A1 Dec. 30, 2021

(51) Int. Cl.
*G01S 19/20* (2010.01)
*G05D 1/04* (2006.01)
(Continued)

(52) U.S. Cl.
CPC .............. *G01S 19/20* (2013.01); *G05D 1/042* (2013.01); *G08G 5/0047* (2013.01); *G06F 17/18* (2013.01)

(58) Field of Classification Search
CPC .......... G01S 19/20; G01S 19/48; G01S 19/15; G05D 1/042; G08G 5/0047; G06F 17/18
See application file for complete search history.

(56) References Cited

U.S. PATENT DOCUMENTS

| | | |
|---|---|---|
| 6,847,893 B1 | 1/2005 | Lupash |
| 7,956,802 B1 | 6/2011 | Hwang et al. |

(Continued)

FOREIGN PATENT DOCUMENTS

| | | |
|---|---|---|
| CN | 1481522 A | 3/2004 |
| CN | 110687557 A | 1/2020 |

(Continued)

OTHER PUBLICATIONS

Blanch et al., "Advanced RAIM User Algorithm Description: Integrity Support Message Processing, Fault Detection, Exclusion, and Protection Level Calculation", Proceedings of the 25th International Technical Meeting of The Satellite Division of the Institute of Navigation (ION GNSS), 2012, pp. 1 through 23.

(Continued)

*Primary Examiner* — Mary Cheung
(74) *Attorney, Agent, or Firm* — Fogg & Powers LLC

(57) ABSTRACT

A method comprises computing position information from a global navigation satellite system (GNSS); computing an altitude measurement based on retrieved information from a vertical position sensor; determining a vertical protection level (VPL) associated with the position information; splitting the VPL into an upward VPL component and a downward VPL component; determining a vertical alert limit (VAL) associated with the altitude measurement; and splitting the VAL into an upward VAL component and a downward VAL component. The method optimizes an integrity budget allocation between the upward and downward VPL components. The method then recomputes the upward and downward VPL components given the optimized integrity budget allocation.

20 Claims, 3 Drawing Sheets

(51) Int. Cl.
*G08G 5/00* (2006.01)
*G06F 17/18* (2006.01)

(56) References Cited

U.S. PATENT DOCUMENTS

| | | |
|---|---|---|
| 8,494,693 B2 | 7/2013 | Murphy |
| 10,416,315 B2 | 9/2019 | Skalicky et al. |
| 2015/0145719 A1* | 5/2015 | Dunik .................. G01S 19/28 342/357.22 |
| 2018/0283871 A1 | 10/2018 | Kana et al. |
| 2019/0187295 A1* | 6/2019 | Lee ...................... G01S 19/071 |

FOREIGN PATENT DOCUMENTS

| | | | | |
|---|---|---|---|---|
| CN | 110196434 B | * | 5/2022 | ............. G01S 19/20 |
| EP | 2015097 B1 | | 8/2010 | |

OTHER PUBLICATIONS

Kropp et al., "Optimized MHSS ARAIM User Algorithms: Assumptions, Protection Level Calculation and Availability Analysis", 2014, pp. 308 through 323, IEEE.
Cypriano, Lucas A. et al., "Handling of ARAIM Terrain Database Induced Errors", U.S. Appl. No. 16/554,458, filed Aug. 28, 2019, pp. 1 through 34, Published: US.
Blanch et al. "Advanced RAIM User Algorithm Description: Integrity Support Message Processing, Fault Detection, Exclusion, and Protection Level Calculation", 25th International Technical Meeting of the Satellite Division of The Institute of Navigation, Sep. 2012, pp. 2828 through 2849, Nashville, TN.
Braff, "Integrated GNSS/Altimeter Landing System", ION GNSS 20th International Technical Meeting of the Satellite Division, Sep. 2007, pp. 2934 through 2949, Fort Worth, TX.
European Patent Office, "Extended European Search Report from EP Application No. 21169241.3", from Foreign Counterpart to U.S. Appl. No. 16/910,641, dated Sep. 24, 2021, pp. 1 through 8, Published: EP.

* cited by examiner

SPLIT VERTICAL ADVANCED RECEIVER AUTONOMOUS INTEGRITY MONITORING

STATEMENT REGARDING GOVERNMENT SPONSORED RESEARCH OR DEVELOPMENT

The project leading to this application has received funding from the SESAR Joint Undertaking under Grant Agreement No. 731781 under European Union's Horizon 2020 Research and Innovation Programme.

BACKGROUND

Safety critical applications, which use the Global Navigation Satellite System (GNSS) to provide a navigation solution, require not only the computation of position and velocity, but also the provision of integrity. The "integrity" of a computed position solution refers to the measure of trust that can be placed in the correctness of information being output by a GNSS receiver. Integrity monitoring protects users from position errors arising mainly from weak geometries or satellite faults not yet identified by a system ground monitoring network. One common integrity monitoring algorithm used in GNSS is the so-called Receiver Autonomous Integrity Monitoring (RAIM). One of the outputs of RAIM is a protection level defined as the maximal distance between the true position and the calculated position (along the associated dimension—either vertical or horizontal) with extremely high confidence.

In Safety of Life applications such as civil air transport, each phase of flight has defined some alert limits—upper bounds on the computed protection levels. When a protection level exceeds the alert limit, there is not enough integrity to perform that procedure and the pilot must reverse to a less stringent one or use a different source of navigation with enough integrity. Naturally, the desire of the user is to have as low a protection level as possible so as to enable more stringent operations or extend the area where they are available. This problem is especially evident during the approach phase of the flight where the alert limits shrink considerably the closer an aircraft gets to the ground. In order to support the most stringent phases of flight it becomes necessary to include extra sensors to the navigation system to meet the strict requirements. One of the most common sensors that is used to augment GNSS is the radar altimeter.

With current technology, it is very challenging to provide enough integrity to allow aircraft to reach down to a Category II (CAT II) minima. Systems designed to allow business aircraft to fly, even in difficult weather conditions, down to CAT II minima usually require the installation of expensive ground equipment, which not all non-main hub airports are capable of affording. As such, any system that provides better performance, from an integrity perspective, is a step towards further opening airports which, given difficult weather conditions, were previously closed.

One of the proposed solutions that requires no extra ground infrastructure and only minimal changes to the aircraft is to merge current satellite navigation receivers with other sensors, such as a radar altimeter, to improve the geometry and vertical accuracy. However, simulations have shown that this alone may not be sufficient, and that other developments are necessary.

SUMMARY

A method comprises computing position information from a global navigation satellite system (GNSS); computing an altitude measurement based on retrieved information from a vertical position sensor; determining a vertical protection level (VPL) associated with the position information; splitting the VPL into an upward VPL component and a downward VPL component; determining a vertical alert limit (VAL) associated with the altitude measurement; and splitting the VAL into an upward VAL component and a downward VAL component. The method optimizes an integrity budget allocation between the upward and downward VPL components. The method then recomputes the upward and downward VPL components given the optimized integrity budget allocation.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A modified Advanced Receiver Autonomous Integrity Monitoring (ARAIM) method and system are described herein. The present method and system implement an optimized split vertical protection level (VPL) technique, which alters the standard ARAIM algorithm in order to achieve lower protection levels, thereby potentially increasing the service availability provided by a Global Navigation Satellite System (GNSS) receiver. Vehicles such as aircraft equipped with a GNSS receiver having the optimized split VPL technique implemented therein can fly to lower decision heights than previously available.

The present approach takes advantage of the asymmetrical distribution of the vertical navigation errors as well as the asymmetrical impact of these errors on the aircraft operations, especially approach operations like Category II (CAT II) approaches. This asymmetry, which will depend on the radar altimeter and satellite measurements, is used then to re-allocate the total integrity budget, which is defined in the operational requirements for the given phase of flight. Additional benefits can be obtained by defining two different vertical alert limits, one for an upward VPL component and one for a downward VPL component.

Moreover, the present approach optimizes the integrity budget for navigation, and can increase the availability of the navigation system. The present technique allows for the use of extra integrity budget amounts from one side (e.g., upward VPL component) in the other side (e.g., downward VPL component) so as not to waste any of the total integrity budget. This allows the service availability of the GNSS to be as high as possible.

Further details of various embodiments are described hereafter with reference to the drawings.

Figure 1:
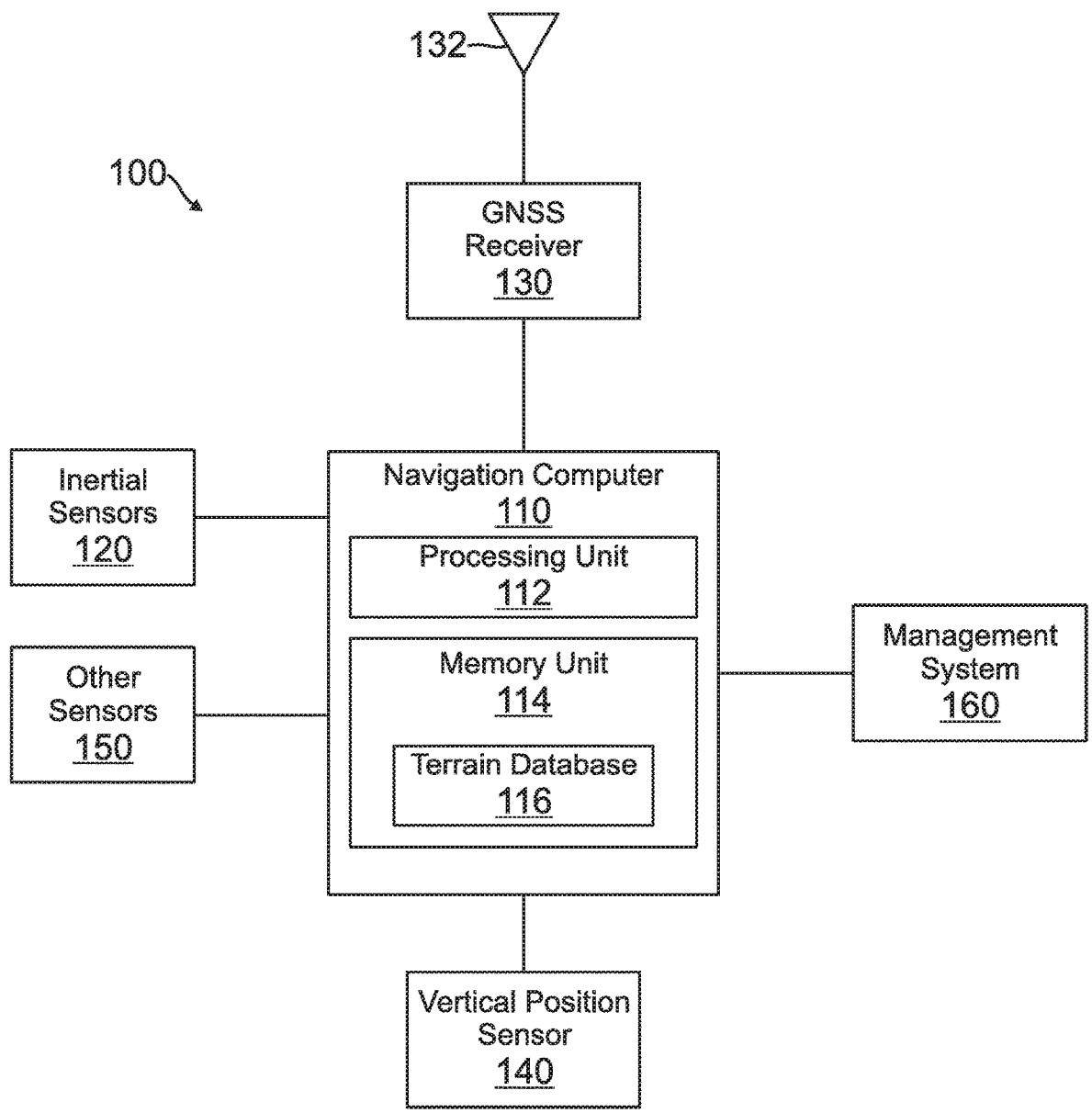
FIG. 1 is a block diagram of a navigation system capable of implementing an optimized split vertical protection level (VPL) technique, according to one embodiment.

FIG. 1 illustrates a navigation system 100 that is capable of implementing the optimized split VPL technique, according to one embodiment. The navigation system 100 can be mounted to a mobile platform, such as various vehicles that can operate in air, on ground, or in water. Examples of such vehicles include manned and unmanned aircraft, spacecraft, automobiles, seacraft, and the like. Additionally, navigation system 100 can acquire navigation information from one or more different sources. To handle the acquired navigation information, the navigation system 100 may include a navigation computer 110. The navigation computer 110 may further include at least one processing unit 112, at least one memory unit 114, and a terrain database 116.

In certain embodiments, navigation system 100 may acquire navigation information that includes inertial motion information and GNSS measurements. To acquire the inertial motion information, navigation system 100 may include one or more inertial sensors 120 that measure and sense the inertial motion of the vehicle containing navigation system 100. To acquire the GNSS measurements, navigation system 100 may include a GNSS receiver 130 with at least one antenna 132 that receives satellite signals from multiple GNSS satellites. Further, navigation system 100 can include at least one vertical position sensor 140, which acquires altitude information for navigation system 100. Additionally, navigation system 100 may include one or more other sensors 150, which may provide additional sensor data to processing unit 112. Examples of other sensors 150 include electro-optical sensors, magnetometers, and the like.

During operation, GNSS receiver 130 receives GNSS satellite signals from GNSS satellites. As used herein, the GNSS satellites may be any combination of global positioning system (GPS) satellites, GLONASS satellites, Galileo system satellites, COMPASS (BeiDou) satellites, or other satellites that form part of the GNSS. The GNSS satellites may provide location information anywhere on earth where there is an unobstructed line of sight to four or more GNSS satellites. The processing unit 112 is operatively coupled to GNSS receiver 130 to receive the satellite signals and extract position/time data from the signals to acquire pseudo-range measurements. Using multiple pseudo-range measurements, processing unit 112 may compute a position, velocity, and time (PVT) solution. Additionally, processing unit 112 may also use the pseudo-range measurements to detect satellite transmitter faults and to determine a worst-case error (a protection level) for the different aspects of the PVT solution.

As described above, navigation computer 110 can receive altitude information from vertical position sensor 140. As used herein, vertical position sensor 140 may refer to a sensing device that acquires the vertical distance of an object from another surface over which the object is positioned. For example, when the object associated with navigation system 100 is an aircraft, vertical position sensor 140 may be an altimeter that acquires the altitude of the aircraft with regards to the surface of the earth. For instance, when vertical position sensor 140 is an altimeter, the altimeter may be a radar altimeter, a pressure altimeter, a sonic altimeter, a laser altimeter, or the like.

As used herein, a radar altimeter may be an altimeter that measures the time taken for a radio signal to reflect from a surface back to navigation system 100. Alternatively, a radar altimeter may be a frequency modulated continuous-wave radar altimeter, where the magnitude of the frequency shift in the reflected signal is proportional with a larger altitude or greater distance traveled by the emitted radio signal.

In some embodiments, navigation computer 110 may use information stored in terrain database 116 in conjunction with the information acquired from vertical position sensor 140. As used herein, terrain database 116 may store information describing a surface over which an object or vehicle travels. For example, terrain database 116 may store information describing locations on the earth surface along with an accompanying elevation.

The processing unit 112 may provide the PVT solution to a management system 160. Additionally, the processing unit 112 may provide information to management system 160, which then calculates the protection level and PVT solution along with indications of any detected faults. In certain embodiments, management system 160 is a separate computational device that communicates with and manages navigation computer 110. Alternatively, while not shown, the management system may include the navigation computer.

To account for errors that may exist in measurements, navigation computer 110 may monitor the integrity of various measurements used while navigating. For example, processing unit 112 may receive GNSS signals from GNSS receiver 130 and monitor the integrity of the received signals. As used herein, integrity is a measure of the level of trust that can be placed in the correctness of the information supplied for use by the navigation system. A system that performs integrity monitoring can monitor the integrity of the various measurements during the operation of the navigation system. To perform integrity monitoring, the navigation computer may implement integrity monitoring algorithms.

In certain embodiments, the integrity monitoring algorithms are based on a solution separation methodology. In a solution separation methodology, a system determines a full solution and one or more subsolutions, where the full solution is calculated based on information acquired from a set of information sources and the subsolutions are calculated based on information acquired from subsets of the set of information sources. Using the full solution and the subsolutions, a system may determine the integrity of the full solution. One integrity monitoring algorithm used in GNSS implementations is the ARAIM algorithm.

In some implementations, the solution separation methodology may be used to determine the integrity of PVT solutions calculated using information acquired from navigation satellites. For example, the main position solution may incorporate a set of pseudoranges from available satellites that are integrated with inertial sensor measurements, where the subsolutions are based on a subset of the pseudoranges from the available satellites. The system may then determine the protection limits for the main position solution based on differences or separations between the main position solution and the subsolutions.

In monitoring the integrity of the received GNSS signals, the navigation computer may calculate various protection levels for the PVT solution for the object. As used herein, a protection level may refer to a statistical bound to the navigational measurements that are calculated using the information from the GNSS satellites. The protection level may define the distance between the edge of a region and the true position of a vehicle that is assured to contain the indicated position of the vehicle with a certain defined probability. Accordingly, the protection level may define a region where the missed alert and false alert requirements are met. Further, the protection level is not affected by actual measurements and the value of the protection level is predictable given reasonable assumptions regarding the expected error characteristics.

In certain embodiments, when calculating the various protection levels, the navigation computer may calculate a horizontal protection level for the horizontal position of the object. As used herein, the horizontal position of an object may refer to a location on the surface of the terrain over which the object is positioned. Accordingly, the horizontal protection level may define a horizontal area around an estimated position of the object. Within a reasonable level of certainty, the actual position of the object is within the defined horizontal area.

In further embodiments, when the horizontal protection level is calculated for the position of the object, the navigation computer may use information from the vertical position sensor and the terrain database to determine a new protection level for the vertical position. This vertical position protection level may be a range of vertical position measurements in relation to the terrain where the actual vertical position of the object in relation to the terrain is within a reasonable level of certainty.

Figure 2:
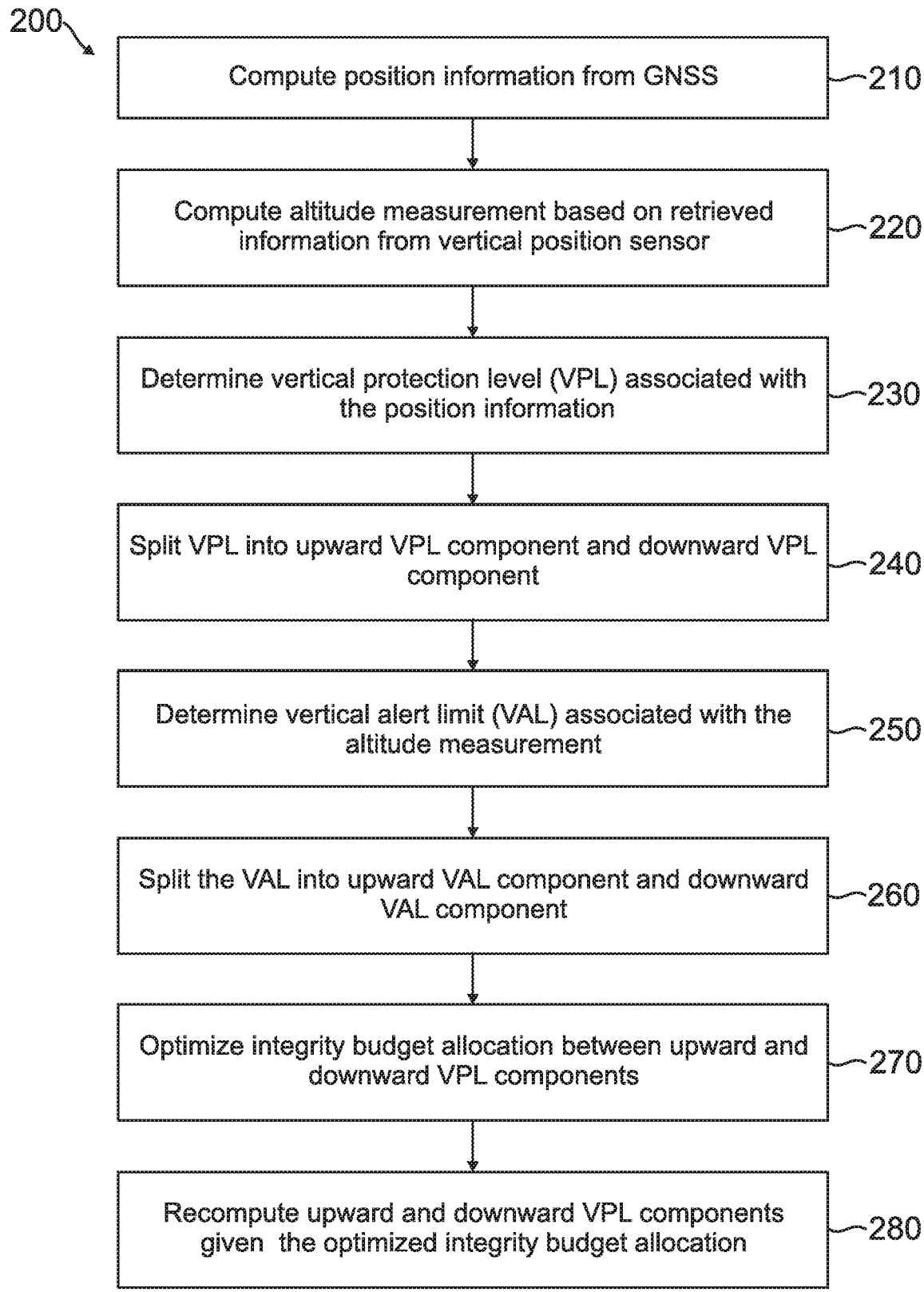
FIG. 2 is a flow diagram of an exemplary method for implementing the optimized split VPL technique.

As described previously, navigation system 100 is capable of implementing the optimized split VPL technique, which alters the standard ARAIM algorithm in order to achieve lower protection levels. FIG. 2 is a flow diagram of an exemplary method 200 for implementing the optimized split VPL technique in such a navigation system.

Initially, method 200 computes position information for a vehicle from GNSS measurements (block 210), and computes an altitude measurement based on retrieved information from a vertical position sensor, such as a radar altimeter (block 220). For example, the position information may be computed by a navigation computer in the vehicle using information based on received GNSS signals. In addition, the altitude measurement may be computed by the navigation computer based on retrieved information from the vertical position sensor.

The method 200 then determines a vertical protection level (VPL) associated with the position information (block 230), and splits the VPL into an upward VPL component and a downward VPL component (block 240). The method 200 also determines a vertical alert limit (VAL) associated with the altitude measurement (block 250), and splits the VAL into an upward VAL component and a downward VAL component (block 260).

In some implementations, method 200 can monitor the downward VPL component with respect to the downward VAL component. If the downward VPL component is less than the downward VAL component, method 200 sets the downward VPL component equal to the downward VAL component.

The method 200 then optimizes an integrity budget allocation between the upward and downward VPL components (block 270), and recomputes the upward and downward VPL components given the optimized integrity budget allocation (block 280). The foregoing steps can be done by the navigation computer in the vehicle.

Additional details with respect to the optimized split VPL technique are described as follows.

On conventional integrity monitor systems, the VAL and the protection level are the same, regardless of whether the error is directed upwards or downwards. In other words, the such systems assume that any error distribution will be symmetrical about the horizontal plane and treats the vertical dimension as a single case. This is not optimal for a system that makes use of a radar altimeter. Due to the way the radar and terrain database are designed, the vertical error tends to always point upwards.

This tendency, for upward errors, is related to the fact that it is safer for the plane to be higher than it expects to be than for it to be lower than it expects to be. After all, the aircraft is far less likely to encounter obstacles by being higher than expected, while being lower than expected could indeed severely increase the likelihood of encountering an obstacle.

In the baseline ARAIM, the equation used to compute the vertical protection level (VPL) is disclosed in Blanch et al., *Advanced RAIM user Algorithm Description: Integrity Support Message Processing, Fault Detection, Exclusion, and Protection Level Calculation*, Proceedings of the 25th International Technical Meeting of The Satellite Division of the Institute of Navigation (ION GNSS 2012), the disclosure of which is incorporated by reference herein. The equation used to compute the VPL is defined as:

$$\sum_{k=1}^{N_{faultModes}} P_{fault,k} \cdot Q\left(\frac{VPL - b_3^k - T_3^k}{\sigma_3^k}\right) + 2Q\left(\frac{VPL - b_3^0}{\sigma_3^0}\right) = P_{HMI,vert,adj}$$

where:

$$P_{HMI,vert,adj} = P_{HMI,vert}\left(1 - \frac{P_{fails,unmonitored}}{P_{HMI,vert} + P_{HMI,hor}}\right);$$

$$P_{fails,unmonitored} = P_{sat,unmonitored} + P_{const,unmonitored};$$

$N_{faultModes}$—is the number of fault modes (subsolutions);

$P_{fault,k}$—is the probability of fault mode (subsolution) k;

$Q(\ )$—(1−p)—quantile of a zero-mean Gaussian distribution with unit variance;

VPL—is the vertical protection level;

$b_3^k$—is the vertical bias (projected to position domain) for fault mode (subsolution) k;

$T_3^k$—is the solution separation threshold for fault mode (subsolution) k;

$\sigma_3^k$—is the vertical standard deviation (square root of element [3,3] of fault mode, subsolution, k covariance matrix);

$b_3^0$—is the vertical bias (projected to position domain) for full solution;

$\sigma_3^0$—is the vertical standard deviation (square root of element [3,3] of full solution covariance matrix);

$P_{HMI}$—is the total integrity budget;

$P_{HMI,vert}$ is the $P_{HMI}$ budget allocated for the vertical dimension;

$P_{HMI,hor}$ is the $P_{HMI}$ budget allocated for the horizontal dimension;

$P_{fails,unmonitored}$—is the probability of unmonitored fault modes;

$P_{sat,unmonitored}$—is the probability of unmonitored satellite fault modes; and $P_{const,unmonitored}$—is the probability of unmonitored constellation fault modes (two or more constellations simultaneously fail).

Given the initial assumption that space for error as well as the severity of an error is asymmetrical on the vertical dimension during an approach using a GNSS/Satellite-based Augmentation System (SBAS) augmented with a radar altimeter, the present method takes advantage of this by splitting the VPL into two components, an upward VPL component ($VPL_{UP}$) and a downward VPL component ($VPL_{DOWN}$). The following describes a proposed method to perform the split.

Given that now there will be two equations, one for the up case and one for the down case, each case need only to handle their half of the distribution. Thus, the fault-free term of the VPL equations will be divided by two.

The split of the faulted term of the equations is more complex and depends on how the fault probabilities naturally split between the up and down cases. This split is captured by the M(k) and N(k) coefficients in the $VPL_{UP}$ and a $VPL_{DOWN}$ equations, respectively.

$$\sum_{k=1}^{N_{fault\,Modes}} N(k) \cdot P_{fault,k} \cdot Q\left(\frac{VPL_{DOWN} - b_3^k - T_3^k}{\sigma_3^k}\right) + Q\left(\frac{VPL_{DOWN} - b_3^0}{\sigma_3^0}\right) = P_{HMI,vert,adj}^{DOWN}$$

Here the method performs the regular check of $VPL_{DOWN}$ against the downward VAL component ($VAL_{DOWN}$). Should $VPL_{DOWN} < VAL_{DOWN}$ the method may proceed to setting $VPL_{DOWN} = VAL_{DOWN}$ to use as little of the $P_{HMI,vert,adj}$ budget as possible, allowing for a larger portion of the budget to be used on $VPL_{UP}$ as that is where, it is assumed, the majority of the errors lay, and solving the following equation for $P_{HMI,vert,adj}^{DOWN}$, which is the budget of the integrity allocated to the vertical dimension, downward component.

$$\sum_{k=1}^{N_{fault\,Modes}} N(k) \cdot P_{fault,k} \cdot Q\left(\frac{VAL_{DOWN} - b_3^k - T_3^k}{\sigma_3^k}\right) + Q\left(\frac{VAL_{DOWN} - b_3^0}{\sigma_3^0}\right) = P_{HMI,vert,adj}^{DOWN}$$

With the computed $P_{HMI,vert,adj}^{DOWN}$ the method can now proceed to compute VPL by solving the following equation:

$$\sum_{k=1}^{N_{fault\,Modes}} M(k) \cdot P_{fault,k} \cdot Q\left(\frac{VPL_{UP} - b_3^k - T_3^k}{\sigma_3^k}\right) + Q\left(\frac{VPL_{UP} - b_3^0}{\sigma_3^0}\right) = P_{HMI,vert,adj} - P_{HMI,vert,adj}^{DOWN}$$

where:

$$M(k) = \begin{cases} 1/2, & \text{for satellite faults} \\ X, & \text{for radar altimter fault} \end{cases};$$

$$N(k) = \begin{cases} 1/2, & \text{for satellite faults} \\ 1-X, & \text{for radar altimter fault} \end{cases};$$

$$P_{HMI,vert,adj} = P_{HMI,vert}\left(1 - \frac{P_{fails,unmonitored}}{P_{HMI,vert} + P_{HMI,hor}}\right);$$

$P_{fails,unmonitored} = P_{sat,unmonitored} + P_{const,unmonitored}$; and $P_{HMI,vert,adj}$ is the budget of the integrity allocated to the vertical dimension.

The present approach can also be applied to worst-case bias projections. Signs of biases on satellite measurements are considered random, however, as the radar altimeter keeps errors on the conservative side, its bias may be considered one-sided. This can be utilized to reduce the overall impact of bias on the downward vertical direction. The present method generally takes advantage of the extra margin available on the vertical up direction to conserve $P_{HMI}$ budget for the vertical down direction which faces more stringent conditions.

Figure 3:
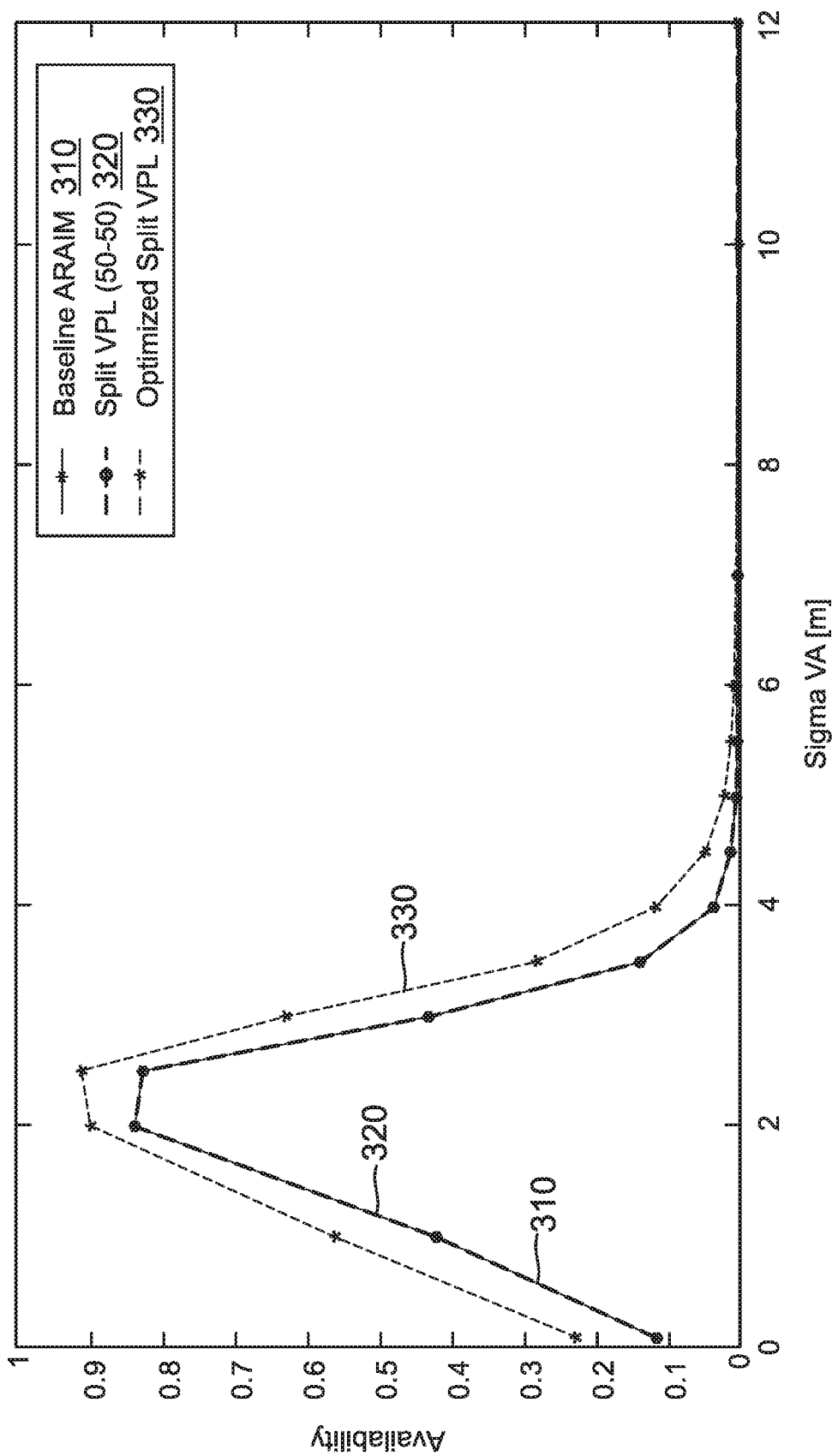
FIG. 3 is a graph of the results of a simulation to evaluate the comparative effectiveness of the optimized split VPL technique.

A simulation to evaluate the effectiveness of the optimized split VPL technique was performed and the results are depicted in the graph of FIG. 3. In the graph of FIG. 3, sigma VA is the standard deviation of the error of a radar altimeter. The alert limit used was 11.68 m (estimated vertical alert limit for CAT II operations). The plot lines show the baseline ARAIM technique (curve 310), a split VPL (50-50) (curve 320), and the optimized split VPL technique (curve 330) of the present approach.

FIG. 3 illustrates how availability changes according to how good or how bad the radar altimeter is functioning, and provides a comparison of the baseline ARAIM technique and the optimized split VPL technique. The split VPL (50-50) was provided as a sanity check to make sure the algorithm was coded properly. The split VPL (50-50) splits the budget evenly, with 50 percent for the upward VPL component and 50 percent for the downward VPL component. As shown in FIG. 3, the split VPL (50-50) gave the same result as the baseline ARAIM technique, as curves 310 and 320 are on top of each other, so the split VPL (50-50) was coded correctly. Thus, the split VPL (50/50) is equivalent to the baseline ARAIM technique.

As also shown in FIG. 3, the optimized split VPL technique pushes curve 330 upward with respect to curves 310 and 320, which at some points provides up to about 10 percent of an increased availability—a significant increase. This increased availability provides extra performance for the system.

The processing unit and/or other computational devices used in the navigation system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: computing position information from a global navigation satellite system (GNSS); computing an altitude measurement based on retrieved information from a vertical position sensor; determining a vertical protection level (VPL) associated with the position information; splitting the VPL into an upward VPL component and a downward VPL component; determining a vertical alert limit (VAL) associated with the altitude measurement; splitting the VAL into an upward VAL component and a downward VAL component; optimizing an integrity budget allocation between the upward and downward VPL components; and recomputing the upward and downward VPL components given the optimized integrity budget allocation.

Example 2 includes the method of Example 1, further comprising: monitoring the downward VPL component with respect to the downward VAL component; and if the downward VPL component is less than the downward VAL component, setting the downward VPL component equal to the downward VAL component, thereby allowing a larger portion of the integrity budget allocation to be used for the upward VPL component.

Example 3 includes the method of any of Examples 1-2, wherein the downward VPL component is defined by the equation:

$$\sum\nolimits_{k=1}^{N_{fault\ Modes}} N(k) \cdot P_{fault,k} \cdot Q\left(\frac{VPL_{DOWN} - b_3^k - T_3^k}{\sigma_3^k}\right) +$$

$$Q\left(\frac{VPL_{DOWN} - b_3^0}{\sigma_3^0}\right) = P_{HMI,vert,adj}^{DOWN}$$

where:

$N_{faultModes}$ is number of fault mode sub solutions;

$$N(k) = \begin{cases} 1/2, & \text{for satellite faults} \\ 1-X, & \text{for radar altimter fault} \end{cases};$$

$P_{fault,k}$ is probability of a fault mode subsolution k;
Q is a quantile of a zero-mean Gaussian distribution with unit variance;
$VPL_{DOWN}$ is the downward VPL component;
$b_3^k$ is vertical bias for a fault mode subsolution k;
$T_3^k$ is solution separation threshold for the fault mode subsolution k;

$\sigma_3^k$ is vertical standard deviation of a fault mode subsolution k covariance matrix;
$b_3^0$ is vertical bias for a full solution;
$\sigma_3^0$ is vertical standard deviation of a full solution covariance matrix; and
$P_{HMI,vert,adj}^{DOWN}$ is the budget of the integrity allocated to the vertical dimension, downward component.

Example 4 includes the method of Example 3, wherein the downward VAL component is defined by the equation:

$$\sum\nolimits_{k=1}^{N_{fault\ Modes}} N(k) \cdot P_{fault,k} \cdot Q\left(\frac{VAL_{DOWN} - b_3^k - T_3^k}{\sigma_3^k}\right) + Q\left(\frac{VAL_{DOWN} - b_3^0}{\sigma_3^0}\right) =$$

$$P_{HMI,vert,adj}^{DOWN};$$

where:

$VAL_{DOWN}$ is the downward VAL component; and the upward VPL component is defined by the equation:

$$\sum\nolimits_{k=1}^{N_{fault\ Modes}} M(k) \cdot P_{fault,k} \cdot Q\left(\frac{VPL_{UP} - b_3^k - T_3^k}{\sigma_3^k}\right) + Q\left(\frac{VPL_{UP} - b_3^0}{\sigma_3^0}\right) =$$

$$P_{HMI,vert,adj} - P_{HMI,vert,adj}^{DOWN}$$

where:

$$M(k) = \begin{cases} 1/2, & \text{for satellite faults} \\ X, & \text{for radar altimter fault} \end{cases};$$

$$P_{HMI,vert,adj} = P_{HMI,vert}\left(1 - \frac{P_{fails,unmonitored}}{P_{HMI,vert} + P_{HMI,hor}}\right);$$

$P_{fails,unmonitored} = P_{sat,unmonitored} + P_{const,unmonitored}$;

$P_{HMI,vert,adj}$ is the budget of the integrity allocated to the vertical dimension;
$P_{fails,unmonitored}$ is the probability of unmonitored fault modes;
$P_{sat,unmonitored}$ is the probability of unmonitored satellite fault modes;
$P_{const,unmonitored}$ is the probability of unmonitored constellation fault modes;
$P_{HMI,vert}$ is the $P_{HMI}$ budget allocated for vertical dimension; and
$P_{HMI,hor}$ is the $P_{HMI}$ budget allocated for horizontal dimension.

Example 5 includes the method of any of Examples 1-4, wherein the position information from the GNSS is computed for a mobile platform comprising a vehicle.

Example 6 includes the method of Example 5, wherein the vehicle is an aircraft.

Example 7 includes the method of any of Examples 5-6, wherein the vehicle includes a navigation system comprising: a navigation computer including at least one processing unit, and at least one memory unit; a GNSS receiver in operative communication with the navigation computer, the GNSS receiver configured to receive one or more satellite signals from multiple GNSS satellites; and the vertical position sensor, which is in operative communication with the navigation computer, the vertical position sensor configured to acquire altitude information for the vehicle.

Example 8 includes the method of Example 7, wherein the navigation system further comprises: one or more inertial sensors in operative communication with the navigation computer, the one or more inertial sensors configured to measure inertial motion of the vehicle.

Example 9 includes the method of any of Examples 1-8, wherein the vertical position sensor comprises a radar altimeter.

Example 10 includes a system comprising: a navigation computer onboard a vehicle, the navigation computer including at least one processing unit; an onboard GNSS receiver in operative communication with the navigation computer, the GNSS receiver configured to receive one or more signals from multiple GNSS satellites; and a vertical position sensor in operative communication with the navigation computer, the vertical position sensor configured to acquire altitude information for the vehicle; wherein the at least one processing unit is operative to perform a method comprising: computing position information for the vehicle based on one or more signals received by the GNSS receiver; computing an altitude measurement for the vehicle based on acquired altitude information from the vertical position sensor; determining a VPL associated with the position information; splitting the VPL into an upward VPL component and a downward VPL component; determining a VAL associated with the altitude measurement; splitting the VAL into an upward VAL component and a downward VAL component; optimizing an integrity budget allocation between the upward and downward VPL components; and recomputing the upward and downward VPL components given the optimized integrity budget allocation.

Example 11 includes the system of Example 10, wherein the vehicle is an aircraft.

Example 12 includes the system of any of Examples 10-11, wherein the vertical position sensor comprises a radar altimeter.

Example 13 includes the system of any of Examples 10-12, wherein the at least one processing unit is operative to perform the method further comprising: monitoring the downward VPL component with respect to the downward VAL component; and if the downward VPL component is less than the downward VAL component, setting the downward VPL component equal to the downward VAL component, thereby allowing a larger portion of the integrity budget allocation to be used for the upward VPL component.

Example 14 includes the system of any of Examples 10-13, further comprising: one or more inertial sensors in operative communication with the navigation computer, the one or more inertial sensors configured to measure inertial motion of the vehicle.

Example 15 includes a computer program product comprising: a non-transitory computer readable medium having instructions stored thereon, executable by a processer, to perform a method comprising: computing position information from a GNSS; computing an altitude measurement based on retrieved information from a vertical position sensor; determining a VPL associated with the position information; splitting the VPL into an upward VPL component and a downward VPL component; determining a VAL associated with the altitude measurement; splitting the VAL into an upward VAL component and a downward VAL component; optimizing an integrity budget allocation between the upward and downward VPL components; and recomputing the upward and downward VPL components given the optimized integrity budget allocation.

Example 16 includes the computer program product of Example 15, wherein the non-transitory computer readable medium has instructions stored thereon to perform the method further comprising: monitoring the downward VPL component with respect to the downward VAL component; and if the downward VPL component is less than the downward VAL component, setting the downward VPL component equal to the downward VAL component, thereby allowing a larger portion of the integrity budget allocation to be used for the upward VPL component.

Example 17 includes the computer program product of any of Examples 15-16, wherein the position information from the GNSS is computed for a vehicle.

Example 18 includes the computer program product of any of Examples 15-17, wherein the position information from the GNSS is computed for an aircraft.

Example 19 includes the computer program product of any of Examples 15-18, wherein the altitude measurement from the vertical position sensor is computed based on retrieved information from a radar altimeter.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
    computing position information from a global navigation satellite system (GNSS) for a mobile platform comprising a vehicle that includes a navigation system comprising:
        a navigation computer including at least one processing unit, and at least one memory unit;
        a GNSS receiver in operative communication with the navigation computer, the GNSS receiver configured to receive one or more satellite signals from multiple GNSS satellites; and
        a vertical position sensor, which is in operative communication with the navigation computer, the vertical position sensor configured to acquire altitude information for the vehicle;
    computing an altitude measurement based on retrieved information from the vertical position sensor;
    determining a vertical protection level (VPL) associated with the position information;
    splitting the VPL into an upward VPL component and a downward VPL component;
    determining a vertical alert limit (VAL) associated with the altitude measurement;
    splitting the VAL into an upward VAL component and a downward VAL component;
    optimizing an integrity budget allocation between the upward and downward VPL components; and
    recomputing the upward and downward VPL components given the optimized integrity budget allocation.

2. The method of claim 1, further comprising:
    monitoring the downward VPL component with respect to the downward VAL component; and
    if the downward VPL component is less than the downward VAL component, setting the downward VPL component equal to the downward VAL component, thereby allowing a larger portion of the integrity budget allocation to be used for the upward VPL component.

3. The method of claim 1, wherein the downward VPL component is defined by the equation:

$$\sum_{k=1}^{N_{fault\,Modes}} N(k) \cdot P_{fault,k} \cdot Q\left(\frac{VPL_{DOWN} - b_3^k - T_3^k}{\sigma_3^k}\right) + Q\left(\frac{VPL_{DOWN} - b_3^0}{\sigma_3^0}\right) = P_{HMI,vert,adj}^{DOWN}$$

where:

$N_{faultModes}$ is number of fault mode sub solutions;

$$N(k) = \begin{cases} 1/2, & \text{for satellite faults} \\ 1-X, & \text{for radar altimter fault} \end{cases};$$

$P_{fault,k}$ is probability of a fault mode subsolution k;
Q is a quantile of a zero-mean Gaussian distribution with unit variance;
$VPL_{DOWN}$ is the downward VPL component;
$b_3^k$ is vertical bias for a fault mode subsolution k;
$T_3^k$ is solution separation threshold for the fault mode subsolution k;
$\sigma_3^k$ is vertical standard deviation of a fault mode subsolution k covariance matrix;
$b_3^0$ is vertical bias for a full solution;
$\sigma_3^0$ is vertical standard deviation of a full solution covariance matrix; and
$P_{HMI,vert,adj}^{DOWN}$ HMI,vert,adj is the budget of the integrity allocated to the vertical dimension, downward component.

4. The method of claim 3, wherein:
the downward VAL component is defined by the equation:

$$\sum_{k=1}^{N_{fault\,Modes}} N(k) \cdot P_{fault,k} \cdot Q\left(\frac{VAL_{DOWN} - b_3^k - T_3^k}{\sigma_3^k}\right) + Q\left(\frac{VAL_{DOWN} - b_3^0}{\sigma_3^0}\right) = P_{HMI,vert,adj}^{DOWN};$$

where:

$VAL_{DOWN}$ is the downward VAL component; and
the upward VPL component is defined by the equation:

$$\sum_{k=1}^{N_{fault\,Modes}} M(k) \cdot P_{fault,k} \cdot Q\left(\frac{VPL_{UP} - b_3^k - T_3^k}{\sigma_3^k}\right) + Q\left(\frac{VPL_{UP} - b_3^0}{\sigma_3^0}\right) = P_{HMI,vert,adj} - P_{HMI,vert,adj}^{DOWN}$$

where:

$$M(k) = \begin{cases} 1/2, & \text{for satellite faults} \\ X, & \text{for radar altimter fault} \end{cases};$$

$$P_{HMI,vert,adj} = P_{HMI,vert}\left(1 - \frac{P_{fails,unmonitored}}{P_{HMI,vert} + P_{HMI,hor}}\right);$$

$P_{fails,unmonitored} = P_{sat,unmonitored} P_{const,unmonitored}$;
$P_{HMI,vert,adj}$ is the budget of the integrity allocated to the vertical dimension;
$P_{falls,unmonitored}$ is the probability of unmonitored fault modes;

$P_{sat,unmonitored}$ is the probability of unmonitored satellite fault modes;
$P_{const,unmonitored}$ is the probability of unmonitored constellation fault modes;
$P_{HMI,vert}$ is the $P_{HMI}$ budget allocated for vertical dimension; and
$P_{HMI,hor}$ is the $P_{HMI}$ budget allocated for horizontal dimension.

5. The method of claim 1, wherein the vehicle is an aircraft.

6. The method of claim 1, wherein the navigation system further comprises:
one or more inertial sensors in operative communication with the navigation computer, the one or more inertial sensors configured to measure inertial motion of the vehicle.

7. The method of claim 1, wherein the vertical position sensor comprises a radar altimeter.

8. A system comprising:
a navigation computer onboard a vehicle, the navigation computer including at least one processing unit;
an onboard global navigation satellite system (GNSS) receiver in operative communication with the navigation computer, the GNSS receiver configured to receive one or more signals from multiple GNSS satellites; and
a vertical position sensor in operative communication with the navigation computer, the vertical position sensor configured to acquire altitude information for the vehicle;
wherein the at least one processing unit is operative to perform a method comprising:
computing position information for the vehicle based on one or more signals received by the GNSS receiver;
computing an altitude measurement for the vehicle based on acquired altitude information from the vertical position sensor;
determining a vertical protection level (VPL) associated with the position information;
splitting the VPL into an upward VPL component and a downward VPL component;
determining a vertical alert limit (VAL) associated with the altitude measurement;
splitting the VAL into an upward VAL component and a downward VAL component;
optimizing an integrity budget allocation between the upward and downward VPL components; and
recomputing the upward and downward VPL components given the optimized integrity budget allocation.

9. The system of claim 8, wherein the vehicle is an aircraft.

10. The system of claim 8, wherein the vertical position sensor comprises a radar altimeter.

11. The system of claim 8, wherein the at least one processing unit is operative to perform the method further comprising:
monitoring the downward VPL component with respect to the downward VAL component; and
if the downward VPL component is less than the downward VAL component, setting the downward VPL component equal to the downward VAL component, thereby allowing a larger portion of the integrity budget allocation to be used for the upward VPL component.

12. The system of claim 8, further comprising:
one or more inertial sensors in operative communication with the navigation computer, the one or more inertial sensors configured to measure inertial motion of the vehicle.

13. The system of claim 8, wherein the downward VPL component is defined by the equation:

$$\sum_{k=1}^{N_{fault\ Modes}} N(k) \cdot P_{fault,k} \cdot Q\left(\frac{VPL_{DOWN} - b_3^k - T_3^k}{\sigma_3^k}\right) + Q\left(\frac{VPL_{DOWN} - b_3^0}{\sigma_3^0}\right) = P_{HMI,vert,adj}^{DOWN}$$

where:

$N_{faultModes}$ is number of fault mode sub solutions;

$$N(k) = \begin{cases} 1/2, & \text{for satellite faults} \\ 1 - X, & \text{for radar altimter fault} \end{cases};$$

$P_{fault,k}$ is probability of a fault mode subsolution k;
Q is a quantile of a zero-mean Gaussian distribution with unit variance;
$VPL_{DOWN}$ is the downward VPL component;
$b_3^k$ is vertical bias for a fault mode subsolution k;
$T_3^k$ is solution separation threshold for the fault mode subsolution k;
$\sigma_3^k$ is vertical standard deviation of a fault mode subsolution k covariance matrix;
$b_3^0$ is vertical bias for a full solution;
$\sigma_3^0$ is vertical standard deviation of a full solution covariance matrix; and
$P_{HMI,vert,adj}^{DOWN}$ is the budget of the integrity allocated to the vertical dimension, downward component.

14. The system of claim 13, wherein:
the downward VAL component is defined by the equation:

$$\sum_{k=1}^{N_{fault\ Modes}} N(k) \cdot P_{fault,k} \cdot Q\left(\frac{VAL_{DOWN} - b_3^k - T_3^k}{\sigma_3^k}\right) + Q\left(\frac{VAL_{DOWN} - b_3^0}{\sigma_3^0}\right) = P_{HMI,vert,adj}^{DOWN};$$

where:

$VAL_{DOWN}$ is the downward VAL component; and
the upward VPL component is defined by the equation:

$$\sum_{k=1}^{N_{fault\ Modes}} M(k) \cdot P_{fault,k} \cdot Q\left(\frac{VPL_{UP} - b_3^k - T_3^k}{\sigma_3^k}\right) + Q\left(\frac{VPL_{UP} - b_3^0}{\sigma_3^0}\right) = P_{HMI,vert,adj} - P_{HMI,vert,adj}^{DOWN}$$

where:

$$M(k) = \begin{cases} 1/2, & \text{for satellite faults} \\ X, & \text{for radar altimter fault} \end{cases};$$

$$P_{HMI,vert,adj} = P_{HMI,vert}\left(1 - \frac{P_{fails,unmonitored}}{P_{HMI,vert} + P_{HMI,hor}}\right);$$

$P_{fails,unmonitored} = P_{sat,unmonitored} \cdot P_{const,unmonitored}$;
$P_{HMI,vert,adj}$ is the budget of the integrity allocated to the vertical dimension;
$P_{fails,unmonitored}$ is the probability of unmonitored fault modes;
$P_{sat,unmonitored}$ is the probability of unmonitored satellite fault modes;
$P_{const,unmonitored}$ is the probability of unmonitored constellation fault modes;
$P_{HMI,vert}$ is the $P_{HMI}$ budget allocated for vertical dimension; and
$P_{HMI,hor}$ is the $P_{HMI}$ budget allocated for horizontal dimension.

15. A navigation computer comprising:
a processor in operative communication with a GNSS receiver and a vertical position sensor, the GNSS receiver configured to receive one or more satellite signals, and the vertical position sensor configured to acquire altitude information; and
a non-transitory computer readable medium having instructions stored thereon, executable by the processer, to perform a method comprising:
computing position information based on one or more satellite signals received by the GNSS receiver;
computing an altitude measurement based on retrieved altitude information from the vertical position sensor;
determining a vertical protection level (VPL) associated with the position information;
splitting the VPL into an upward VPL component and a downward VPL component;
determining a vertical alert limit (VAL) associated with the altitude measurement;
splitting the VAL into an upward VAL component and a downward VAL component;
optimizing an integrity budget allocation between the upward and downward VPL components; and
recomputing the upward and downward VPL components given the optimized integrity budget allocation.

16. The navigation computer of claim 15, wherein the non-transitory computer readable medium has instructions stored thereon to perform the method further comprising:
monitoring the downward VPL component with respect to the downward VAL component; and
if the downward VPL component is less than the downward VAL component, setting the downward VPL component equal to the downward VAL component, thereby allowing a larger portion of the integrity budget allocation to be used for the upward VPL component.

17. The navigation computer of claim 15, wherein the position information from the GNSS is computed for a vehicle.

18. The navigation computer of claim 15, wherein the position information from the GNSS is computed for an aircraft.

19. The navigation computer of claim 15, wherein the altitude measurement from the vertical position sensor is computed based on retrieved altitude information from a radar altimeter.

20. The navigation computer of claim 15, further comprising a terrain database in operative communication with the processor, wherein the navigation computer is operative to use information stored in the terrain database in conjunction with the altitude information retrieved from the vertical position sensor.

* * * * *